United States Patent [19]
Smith

[11] 4,058,023
[45] Nov. 15, 1977

[54] ROTATING ASSEMBLY FOR MATERIAL HANDLING EQUIPMENT

[75] Inventor: Floyd O. Smith, Portland, Oreg.

[73] Assignee: ESCO Corporation, Portland, Oreg.

[21] Appl. No.: 638,971

[22] Filed: Dec. 8, 1975

[51] Int. Cl.² .......................................... F16H 55/30
[52] U.S. Cl. ............................... 74/243 DR; 403/337
[58] Field of Search ......... 85/50 C; 301/9 DN, 9 SB, 301/11 R, 9 DP; 52/758 F; 74/243 DR, 448, 447, 446, 439; 403/337, 408, 56

[56] References Cited

U.S. PATENT DOCUMENTS

| 960,899 | 6/1910 | Guyer | 85/50 C |
|---|---|---|---|
| 1,077,410 | 11/1913 | Kling | 403/56 X |
| 1,635,895 | 7/1927 | Michelin | 301/9 DN |
| 2,188,025 | 1/1940 | Weiss | 74/243 DR |
| 2,429,008 | 10/1947 | Wolfe | 74/243 DR |

FOREIGN PATENT DOCUMENTS

| 1,193,489 | 4/1959 | France | 85/50 C |
|---|---|---|---|
| 587,998 | 1/1925 | France | 74/243 DR |

*Primary Examiner*—Andrew V. Kundrat
*Attorney, Agent, or Firm*—Tilton, Fallon, Lungmus, Chestnut & Hill

[57] ABSTRACT

A rotating assembly for material handling equipment such as a cast sprocket ring member and a cast hub member each equipped with bolt openings extending parallel to the axis of rotation, the bolt openings being equipped with spherical zonal surfaces and the bolts being equipped with spherical nuts to permit non-axial disposition of the bolts while the same are essentially under only tension.

2 Claims, 7 Drawing Figures

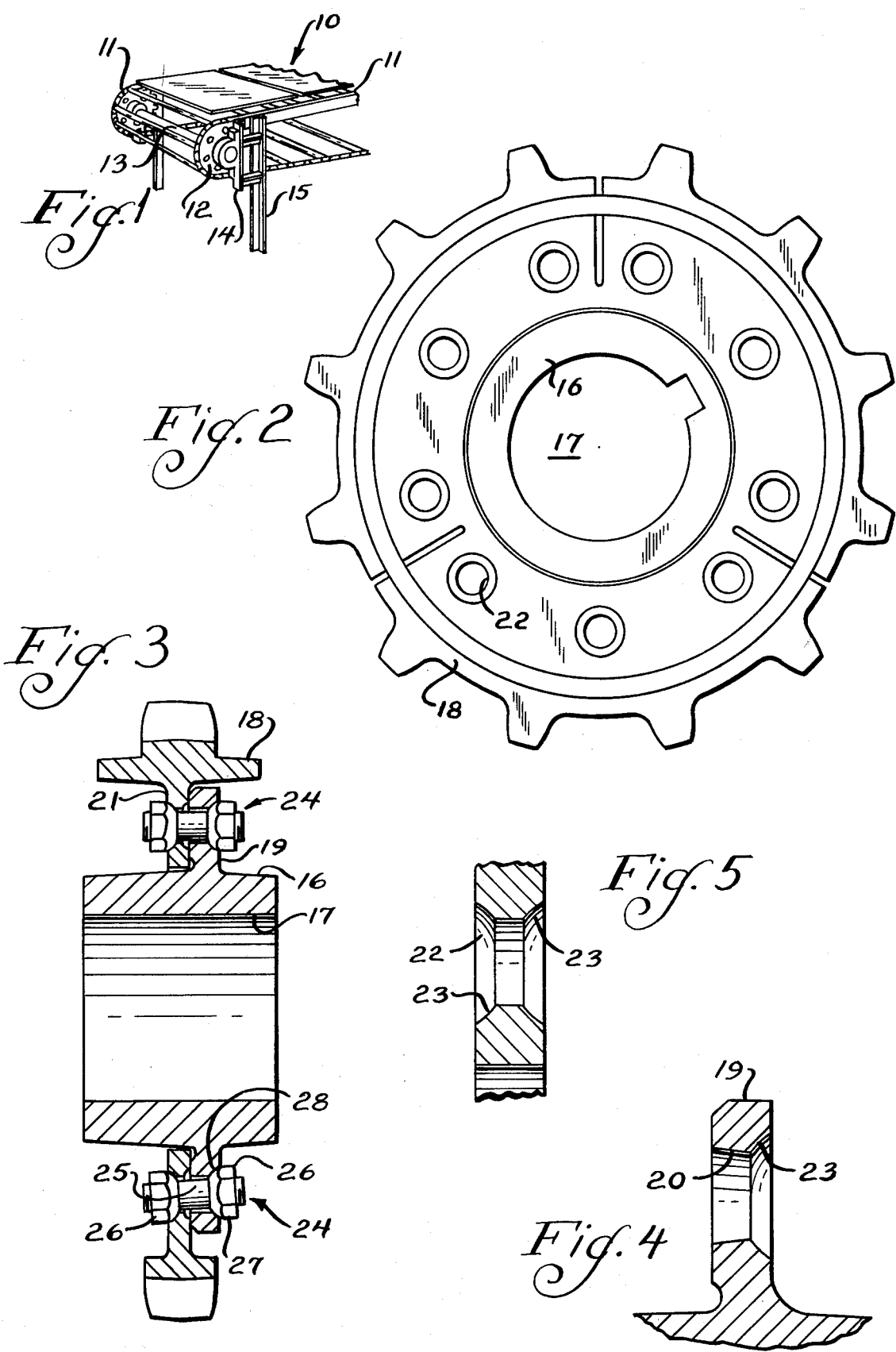

ROTATING ASSEMBLY FOR MATERIAL HANDLING EQUIPMENT

BACKGROUND AND SUMMARY OF INVENTION:

This invention relates to a rotating assembly for material handling equipment and, more particularly, to such rotating assemblies as chain sprockets, conveyor traction wheels and the similar parts on bucket elevators and other material handling wheels and sprockets. Such rotating assemblies encounter tremendous forces, particularly in the larger sizes, and therefore encounter rapid wear — necessitating replacement. Over the years, for the purposes of economy, users of such equipment have gone to cast parts for the assemblies so that replacement of the wearable element, for example, the sprocket tooth ring, can be achieved fairly expeditiously. This has resulted in tremendous forces being exerted against the means coupling the peripheral member, i.e., the sprocket ring, to the hub member. Very often the connecting means, viz., the nut and bolt assemblies have failed prematurely because of the tremendous bending stresses they encounter. These stresses frequently arise because of the inaccuracies of the casting process wherein the openings in the members to be connected are not perfectly aligned in an axial direction.

I have found that this problem with the connecting means can be substantially minimized through the use of spherical zonal bearing surfaces whereby the bolt or other means connecting the members is adapted to assume a non-axial disposition while still remaining essentially under tension. A number of other advantages flow from the invention which may be appreciated from a consideration of the ensuing specification.

DETAILED DESCRIPTION

The invention is described in conjunction with an illustrative embodiment in the accompanying drawing, in which FIG. 1 is a fragmentary perspective view of a piece of material handling equipment, i.e., a sprocket-equipped conveyor which advantageously employs the teachings of this invention;

FIG. 2 is an elevational view of a sprocket-hub assembly;

FIG. 3 is a sectional view of the assembly of FIG. 2;

FIG. 4 is an enlarged fragmentary sectional view of a portion of the hub member of FIG. 3;

FIG. 5 is an enlarged fragmentary sectional view of a portion of the sprocket member of FIG. 3;

Figure 6:
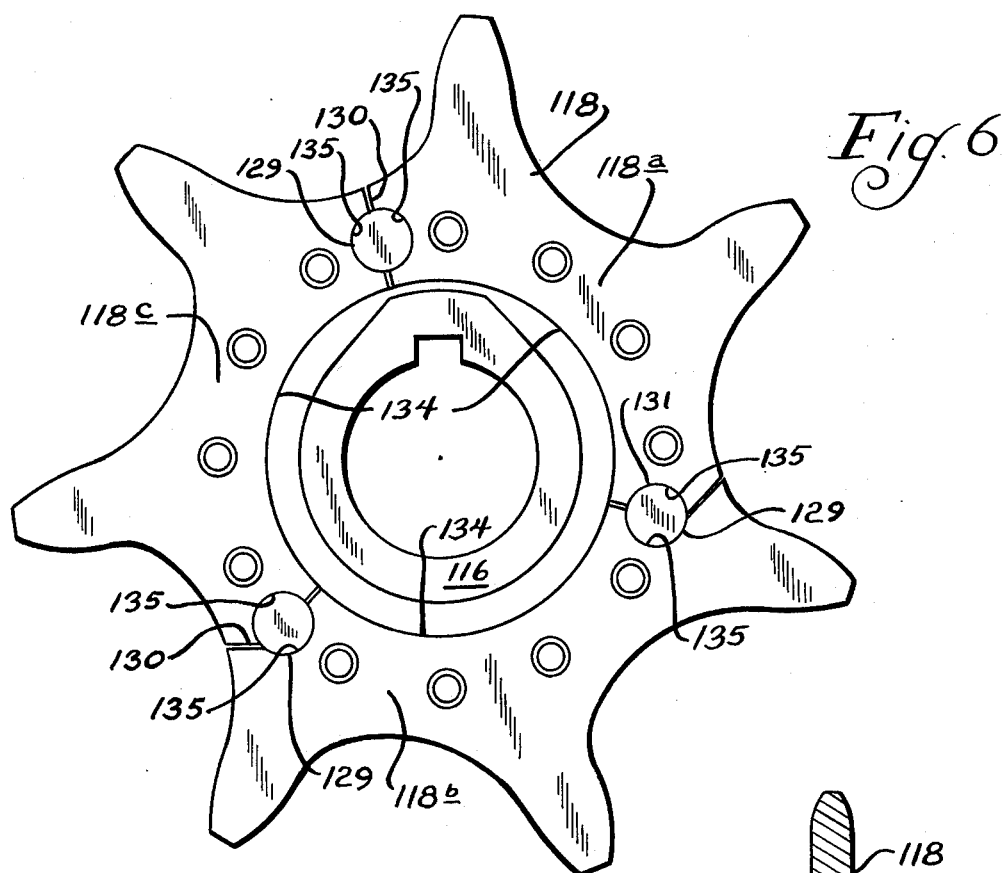
FIG. 6 is a view similar to FIG. 2 but showing a segmented sprocket ring member.

In the illustration given, and with reference to FIG. 1, the numeral 10 designates generally a piece of material handling equipment which may employ the teachings of this invention. In the illustration given, the equipment is a plate conveyor including side chains 11 and end sprocket assemblies 12 mounted on a cross shaft 13. The shaft 13 is journalled in bearings 14 provided as part of the frame 15. As indicated previously, a wide variety of applications of the invention are possible and the foregoing is merely given for explanation of one possible environment.

The sprocket assembly 12 can be seen in greater detail in FIGS. 2 and 3.

The sprocket assembly includes a hub member 16 equipped with a passage 17 for mounting on the cross shaft 13. Clamped to the hub member 16 is a peripheral member 18 (here shown as a toothed sprocket).

The hub member 16 is equipped with a peripheral flange 19 (see also FIG. 4). The flange 19 has extending axially therethrough a plurality of openings 20. In like fashion, the peripheral member 18 has an inwardly extending flange 21 equipped with openings 22 (see FIG. 5) extending axially therethrough. The invention here is particularly concerned with the means for securing the peripheral member 18 to the hub member 16.

For the purpose of securing these two members together, I equip each opening 20 or 22, as the case may be with a spherical zonal bearing surface 23 at at least one end of the opening 20 or 22. For clamping the parts 16 and 18 together, I employ a bolt means generally designated 24 (see FIG. 3) which, in the embodiment illustrated, includes a threaded stud 25 equipped with spherical nuts 26 at each end. The spherical nuts have inwardly facing bearing surfaces (for coaction with the surfaces 23) which are also zones of spheres. It will be appreciated that the bolt means 24 may have one of the nuts 26 provided as an integral part, i.e., as a bolt head. This is illustrated, for example, in FIG. 7 as at 124 relative to a further modification of the invention.

The spherical configuration of the openings in the two parts bolted together allows the bolt means 24 o automatically align itself by the bolt spherical contact surfaces rotating against the mating spherical seats in the clamped part until bolt alignment is achieved. Sufficient clearance diametrically between the bolt body and the bolt holes in the clamp parts prevents binding of the bolt in the bolt hole. This action makes it possible to successfully bolt together parts whose bolt holes are slightly out of alignment. The situation makes it possible to core such bolt holes in castings where hole misalignment is ever present due to casting shrinkage variables and casting distortion occurrence.

The spherical bolt means if self tightening in the event of slippage between the clamped parts by rotation of the sprocket in service, for example. A slight slippage in the rotation direction between the peripheral member 18 and the hub member 16 will increase the tension in the bolt, thus making it tighter. No bending stress appears in the bolt body as the spherical shape of the ends of the bolt means 24 allows automatic realignment of the bolt to its new center line.

The provision of the polygonally related surfaces 27 on each nut 26 in combination with the spherical zonal surface 28 develops a nonlinear intersection which is advantageous in providing a self-locking feature. This eliminates the need for lock washers or other locking devices. This non-linear intersection occurs at the intersection of the flat sides of the nut with the spherical surface of the nut. This intersection develops an irregularity insofar as spherical contact with the mating uninterrupted surface 23 of the part to be clamped. Such interruption of one surface causes high pressure areas on the nut seat in the clamped part resulting in deflection of the surface of the clamped part. More particularly, the surface 23 deforms elastically and sometimes plastically in such a manner as to resist rotational movement of the nut or bolt. Further, this has been observed to occur even when the bolt is in the axially aligned position.

The spherical seats or zonal bearing surfaces 23 in the opening 22 of the sprocket member 18 enables this member to be assembled in two positions on the hub member 16. Thus, the sprocket may be reversed when the teeth are worn out on one side, thus doubling the service life of the sprocket.

Figure 7:
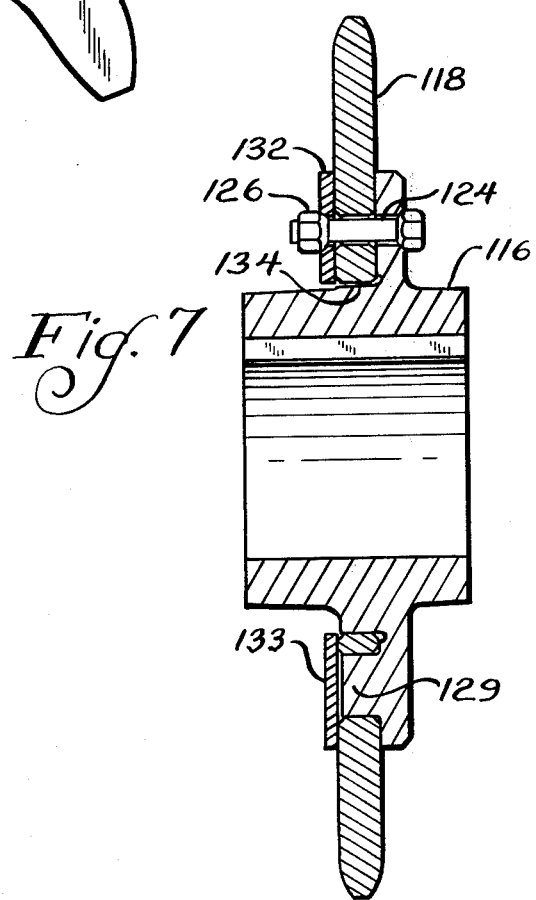
FIG. 7 is a cross sectional view of the assembly of FIG. 6.

Reference is made now to the second drawings sheet, viz., FIGS. 6 and 7 wherein a substantially larger sprocket-hub assembly is shown. The showing in FIGS. 6 and 7 differs essentially from that shown in FIGS. 2 and 3 in presenting a segmented peripheral member or ring 118 mounted on a hub 116. The hub 116 is equipped with a plurality of bosses 129 which are intersected essentially by the radial lines 130 defining the adjacent edges of the segments 118a, 118b and 118c of the peripheral ring 118. When three substantially equal segments are employed for the sprocket, it is relatively easy to remove the sprocket while the chain 11 is still in place. Normally, the chain wrap around the ring 118 is a maximum of 180° so at the time of reversing the sprocket ring, or replacing the same, the heavy chain need not be taken apart. This is particularly advantageous in avoiding the need for any welding since many large conveyor chains are used in grain elevators where welding is prohibited.

In the illustration given in FIGS. 6 and 7, the segments 118a, 118b and 118c are separated slightly from each other along the generally radial line 130. However, each segment along its boundary radial line is equipped with a recess as at 131 which conforms to and abuts against the associated boss 129. In the fashion as described previously, the peripheral ring 118 is coupled to the hub element 116 by means of bolt assemblies 124. The assemblies 124 again are equipped with the spherical zonal bearing surfaces as previously described but in the embodiment illustrated in FIGS. 6 and 7, the spherical nut 126 bears against an annular plate 132 instead of bearing directly against the peripheral member 118. Depending upon the usage, the annular ring 132 may be provided as a separate or integral part of the ring 118. Also, a plate 133 may be employed to cover the bosses 129.

In the embodiment of FIGS. 6 and 7, if it is desired to develop a radial thrust of the ring 118 against the inner peripheral surfaces 134 of the hub or against the outer portions 135 of the bosses — to provide additional support of the radial loads imposed by the chain — such may be accomplished by purposely misaligning the bolts holes in the proper direction, thus tilting the axis of the bolts and producing a side thrust in the desired directions (see the various positions designated 134 and 135 in FIG. 6). This feature of the invention is not limited to the particular embodiment of FIGS. 6 and 7, but is available in any of the applications utilizing the novel connecting means of the invention.

Through this invention, I have provided self-alignment of the bolt in the multi-art assemblies. No bending of the bolt is possible whereby the bolt has more clamping capacity. In fact, the bolt is tighter if creeping of the parts should occur because the clamping effect is increased. The spherical nut and bolt heads are both self locking against the spherical feet. It is possible also to provide a reversible peripheral member such as the sprocket ring. A directional thrust of one clamp part is possible by a tilted bolt axis. More particularly, parts with casts (cored) holes misaligned are successively clamped in place, thus eliminating machined holes.

As a specific illustration of the invention (in the embodiment shown in FIGS. 1-5) a steel alloy was employed for the hub and peripheral members 16 and 18, respectively. The hub weighed 254 pounds (115 kg.) while the ring or peripheral member weighed 132 pounds (61 kg.). The outside diameter of the member 18 was 24.69 inches (627 mm) and the bolt hole circle had a diameter of 14.75 inches (375 mm). The stud 25 had a diameter of 1-5/16 inches whereas the opening 22 had a diameter of 1.44 inches (36 mm). The opening 20 had a slight draft, the diameter increasing from 1.44 inches (36 mm) to 1.56 inches (40 mm). The spherical zonal surfaces were developed by radii of 1.19 inches (30.2 mm) and the axial length of the zonal surfaces 23 was 0.253 inch (6.4 mm). This accommodated a misalignment of the order of about 2° between the axis of the bolt means 24 and the axis of the opening 20. This is particularly illustrated (in exaggerated form) in the lower part of FIG. 3).

The embodiment of FIGS. 6 and 7 included a hub member weighing 670 pounds and a tooth ring or peripheral member weighing 420 pounds. The overall diameter of the sprocket ring shown was 46.25 inches (1175 mm). The bolt circle had a 24 inches diameter (610 mm) with the bolt and nuts being sized similarly to the version of the invention depicted in FIGS. 1-5.

I claim:

1. A rotating assembly for material handling equipment comprising:
    a cast metal hub and a cast metal sprocket fixed thereto and having a common axis of rotation, said sprocket including a plurality of segments circumferentially spaced apart along generally radial lines,
    a plurality of circumferentially spaced-apart openings extending axially through each of said hub and segments and provided therein during casting thereof, and openings in said hub being generally aligned with the openings in said segments for the receipt of a bolt means in each pair of aligned openings,
    each segment opening having spherical zonal surfaces at both ends thereof said hub having a flange providing a pair of faces, one of said faces abutting said segments, the other of said faces having a spherical zonal depression about each hub opening, and
    bolt means extending through each pair of openings and having a slightly smaller diameter than said openings, said bolt means being equipped at each end thereof with a spherical nut means clampingly engaging a spherical zonal surface, whereby said bolt means is adapted to assume a nonaxial disposition because of opening misalignment while still being essentially only under tension in clamping said hub and segments together.

2. A rotating assembly for material handling equipment comprising a cast metal hub member and a cast metal segmented sprocket peripheral member fixed thereto and having a common axis of rotation, a plurality of circumferentially spaced-apart openings extending axially through each member and provided therein during casting thereof, the openings in one member being generally aligned with the openings in the other member for the receipt of a bolt means in each pair of aligned openings, each segment opening having spherical zonal surfaces at both ends thereof, said hub having a flange providing a pair of faces, one of said faces abutting said segments, the other of said faces having a spherical zonal depression about each hub opening, and bolt means extending through each pair of openings and having a slightly smaller diameter than said openings, said bolt means being equipped at each end thereof with the spherical nut means clampingly engaging a spherical zonal surface, whereby said bolt means is adapted to assume a non-axial disposition because of opening misalignment while still being essentially only under tension in clamping said parts together, said peripheral member including a plurality of segments circumferentially spaced apart along generally radial lines, an integral boss on said hub member for each radial line and generally aligned therewith and projecting toward said peripheral member, each segment being equipped with boss-confronting recesses adjacent its radial lines.

* * * * *